US012033574B2

(12) United States Patent
Kim et al.

(10) Patent No.: US 12,033,574 B2
(45) Date of Patent: Jul. 9, 2024

(54) DISPLAY DEVICE AND METHOD FOR DRIVING THE SAME

(71) Applicant: LG Display Co., Ltd., Seoul (KR)

(72) Inventors: Youngtae Kim, Paju-si (KR); Woongjin Seo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 44 days.

(21) Appl. No.: 17/869,714

(22) Filed: Jul. 20, 2022

(65) Prior Publication Data

US 2024/0029646 A1 Jan. 25, 2024

(51) Int. Cl.
*G09G 3/32* (2016.01)
*G09G 3/3225* (2016.01)

(52) U.S. Cl.
CPC ... *G09G 3/3225* (2013.01); *G09G 2300/0452* (2013.01); *G09G 2310/027* (2013.01); *G09G 2320/0233* (2013.01); *G09G 2320/0238* (2013.01)

(58) Field of Classification Search
CPC ... G09G 2320/0233; G09G 2320/0626; G09G 5/10; G09G 3/006; G09G 5/02; G09G 3/3225; G09G 2300/0452; G09G 2310/0452; G09G 2320/0238
See application file for complete search history.

(56) References Cited

U.S. PATENT DOCUMENTS

| | | | | |
|---|---|---|---|---|
| 11,462,156 | B2 * | 10/2022 | Yang | G09G 5/10 |
| 2015/0287350 | A1 * | 10/2015 | Jun | G09G 3/006 345/690 |
| 2017/0098407 | A1 * | 4/2017 | Jeong | G09G 3/3258 |
| 2020/0388207 | A1 * | 12/2020 | Jo | G09G 3/22 |
| 2021/0250574 | A1 * | 8/2021 | Shyshkin | H04N 17/04 |

* cited by examiner

*Primary Examiner* — Kenneth Bukowski
(74) *Attorney, Agent, or Firm* — Seed IP Law Group LLP

(57) ABSTRACT

The disclosure relates to a display device and a method for driving the same, which are capable of enhancing grayscale expression capability at low luminance. An image processor of the display device according to an embodiment of the disclosure converts data of a low-grayscale area lower than a threshold value into low-grayscale reproduction data, using a grayscale reproduction mask pattern including a selected value, the threshold value and a detailed adjustment value, thereby reproducing a luminance of the low-grayscale area through a combination of the threshold value, the selected value and the detailed adjustment value.

18 Claims, 9 Drawing Sheets

M22

| | UIP | | | BCP |
|---|---|---|---|---|
| Grayscales of Image (Input) | Grayscales of P1 | Grayscales of P2 | Grayscales of P3 | Grayscales of P4 |
| 0 | 0 | 0 | 0 | 0 |
| 1 | 0 | 0 | 0 | C |
| ⋮ | ⋮ | ⋮ | ⋮ | ⋮ |
| A | TH | 0 | 0 | D |
| B | TH | TH | 0 | E |
| ⋮ | ⋮ | ⋮ | ⋮ | ⋮ |
| TH | TH | TH | TH | TH |

Comparative Example

Embodiment

DISPLAY DEVICE AND METHOD FOR DRIVING THE SAME

BACKGROUND

Technical Field

The disclosure relates to a display device and a method for driving the same, which are capable of enhancing grayscale expression capability at low luminance.

Description of the Related Art

Light emitting display devices have advantages in that a self-luminous element including an organic light emitting layer configured to emit light through recombination of electrons and holes is used and, as such, it may be possible to not only achieve ultra-thinness, but also to implement various shapes.

In such a light emitting display device, a luminance deviation may be generated among pixels for the same data due to characteristic deviations of light emitting elements, thin film transistors (TFTs), etc., and, as such, luminance non-uniformity may be generated.

BRIEF SUMMARY

The inventors have realized that, in the light emitting display device, the luminance deviation among the pixels may be more severe in a low grayscale area and, as such, a burn-in phenomenon may occur due to luminance non-uniformity. Upon low-grayscale expression, the light emitting display device may not distinguishably express grayscale steps due to low-current driving and the luminance deviation among the pixels and, as such, low-grayscale expression capability may be degraded.

The disclosure of the above-described background art is owned by the inventor of the present disclosure to devise the present disclosure or is technical information acquired by a process of devising the present disclosure, but cannot be regarded as the known art disclosed to the general public before the present disclosure is disclosed.

The disclosure has been made in view of the above-mentioned problems, and a technical benefit of the disclosure is to provide a display device and a method for driving the same, which are capable of enhancing grayscale expression capability at low luminance.

In addition to the technical benefits of the present disclosure as mentioned above, additional technical benefits and features of the present disclosure will be clearly understood by those skilled in the art from the following description of the present disclosure.

In a display device according to an aspect, an image processor may convert first data, lower than a threshold value, of an input image into reproduction data using a reproduction mask pattern and may output the reproduction data while outputting second data, equal to or greater than the threshold value, of the input image without the converting, The reproduction mask pattern may include a selected value, the threshold value and an adjustment value between the selected value and the threshold value as the reproduction data.

In the display device according to the aspect, pixels displaying the reproduction data may include a first pixel displaying a first luminance corresponding to the threshold value, a second pixel displaying a second luminance lower than the first luminance, corresponding to the selected value, and a third pixel displaying a third luminance between the first luminance and the second luminance, corresponding to the adjustment value.

The threshold value may be determined as a minimum grayscale value or a minimum luminance value of pieces of data securing uniformity performance in uniformity measurement of a grayscale-based output image displayed on the panel.

The threshold value may include threshold values of respective colors of subpixels constituting the pixels, the threshold values being determined on a color basis.

The adjustment value may be between the selected value and the threshold value, and determined in accordance with the first data.

In a group of N×M pixels (N and M being natural numbers of 2 or greater), to which the reproduction mask pattern with an N×M pixel size is applied, numbers and positions of the first pixel and the second pixel may be varied in accordance with the first data.

Positions of the first pixel, the second pixel and the third pixel may be varied within the group of N×M pixels in accordance with accumulated usage of a light emitting element comprised in each of the subpixels.

A size of the reproduction mask pattern and the number of the third pixel may be determined, taking into consideration pixels per inch (PPI) of the panel and a viewing distance of a user, or may be adjusted by a request signal from the user.

The group of N×M pixels may include the third pixel, the number of the third pixel being one or two.

A driving method of a display device according to another aspect may include converting first data, lower than a threshold value, of an input image into reproduction data using a reproduction mask pattern and outputting the reproduction data while outputting second data, equal to or greater than the threshold value, of the input image without the converting, the reproduction mask pattern comprising a selected value, the threshold value and an adjustment value between the selected value and the threshold value as the reproduction data, and displaying the output data on a panel, wherein pixels of the panel displaying the reproduction data may include a first pixel displaying a first luminance corresponding to the threshold value, a second pixel displaying a second luminance lower than the first luminance, corresponding to the selected value, and a third pixel displaying a third luminance between the first luminance and the second luminance, corresponding to the adjustment value.

In addition to the features of the present disclosure as mentioned above, additional technical benefits and features of the present disclosure will be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are explanatory and are intended to provide further explanation of the inventive concepts as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate aspects of the disclosure and together with the description serve to explain the principles of the disclosure.

In the drawings.

DETAILED DESCRIPTION

Figure 1:
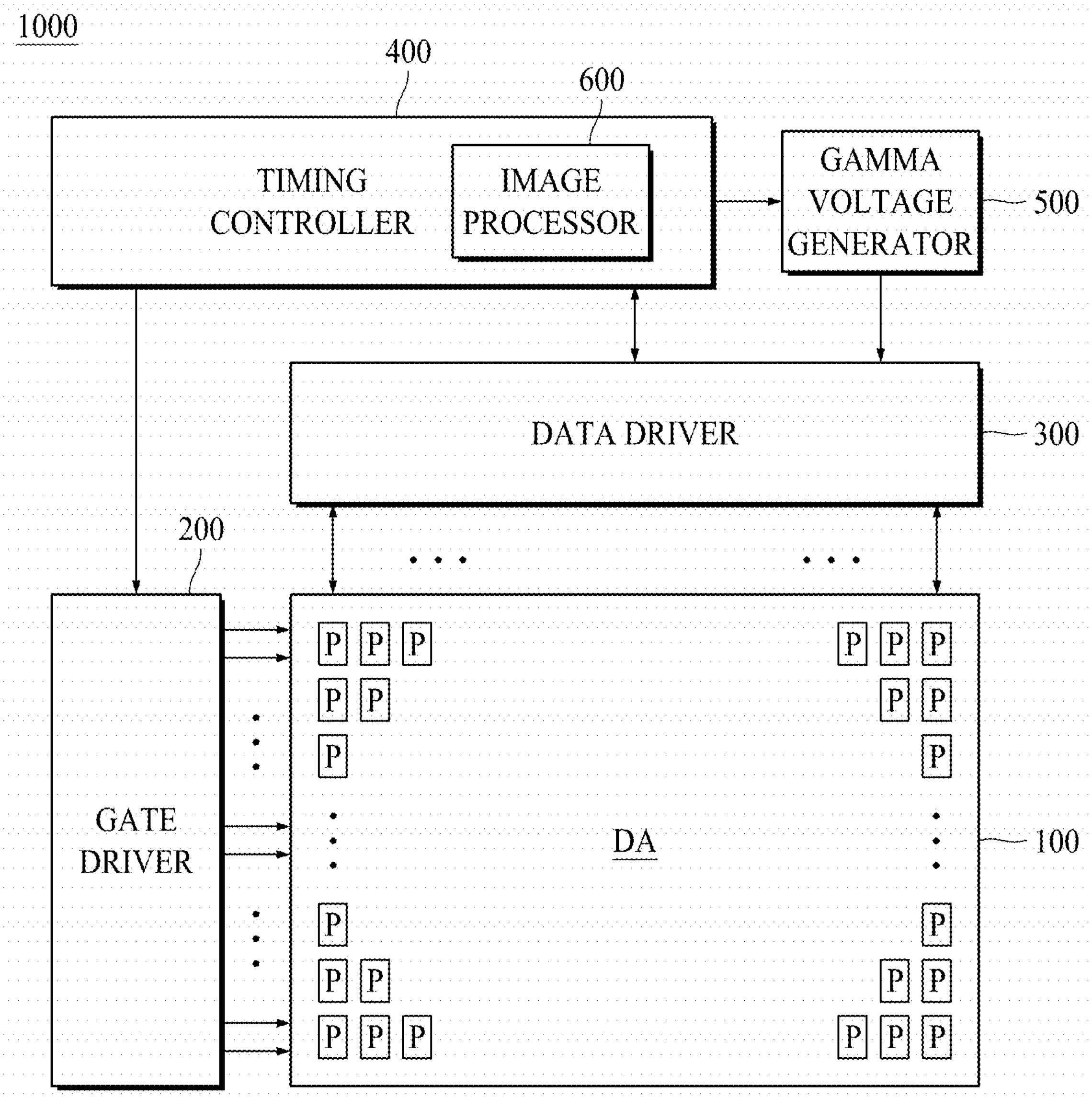
FIG. 1 is a block diagram illustrating a configuration of a display device according to an embodiment.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art.

A shape, a size, a ratio, an angle, and a number disclosed in the drawings for describing aspects of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where ‘comprise,’ ‘have,’ and ‘include’ described in the present specification are used, another part may be added unless ‘only~’ is used. The terms of a singular form may include plural forms unless referred to the contrary.

In construing an element, the element is construed as including an error range although there is no explicit description.

In describing a position relationship, for example, when a position relation between two parts is described as “on,” “over,” “under,” and “next,” one or more other parts may be disposed between the two parts unless a more limiting term, such as “just” or “direct(ly)” is used.

In describing a time relationship, for example, when the temporal order is described as, for example, “after,” “subsequent,” “next,” and “before,” a case which is not continuous may be included unless a more limiting term, such as “just,” “immediate(ly),” or “direct(ly)” is used.

It will be understood that, although the terms “first,” “second,” etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms “first,” “second,” “A,” “B,” “(a),” “(b),” etc., may be used. These terms are intended to identify the corresponding elements from the other elements, and basis, order, or number of the corresponding elements should not be limited by these terms. The expression that an element or a layer is “connected,” “coupled,” or “adhered” to another element or layer may mean the element or layer can not only be directly connected or adhered to another element or layer, but also be indirectly connected or adhered to another element or layer with one or more intervening elements or layers “disposed” between the elements or layers, unless otherwise specified.

The term “at least one” should be understood as including any and all combinations of one or more among the associated listed elements. For example, the meaning of “at least one or more of a first element, a second element, and a third element” denotes the combination of all elements proposed from two or more of the first element, the second element, and the third element as well as the first element, the second element, or the third element.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, embodiments of the disclosure will be described with reference to the accompanying drawings and embodiments. The dimension scales of constituent elements shown in the drawings are different from actual dimension scales, for convenience of description, and, as such, the disclosure is not limited thereto.

Figure 2:
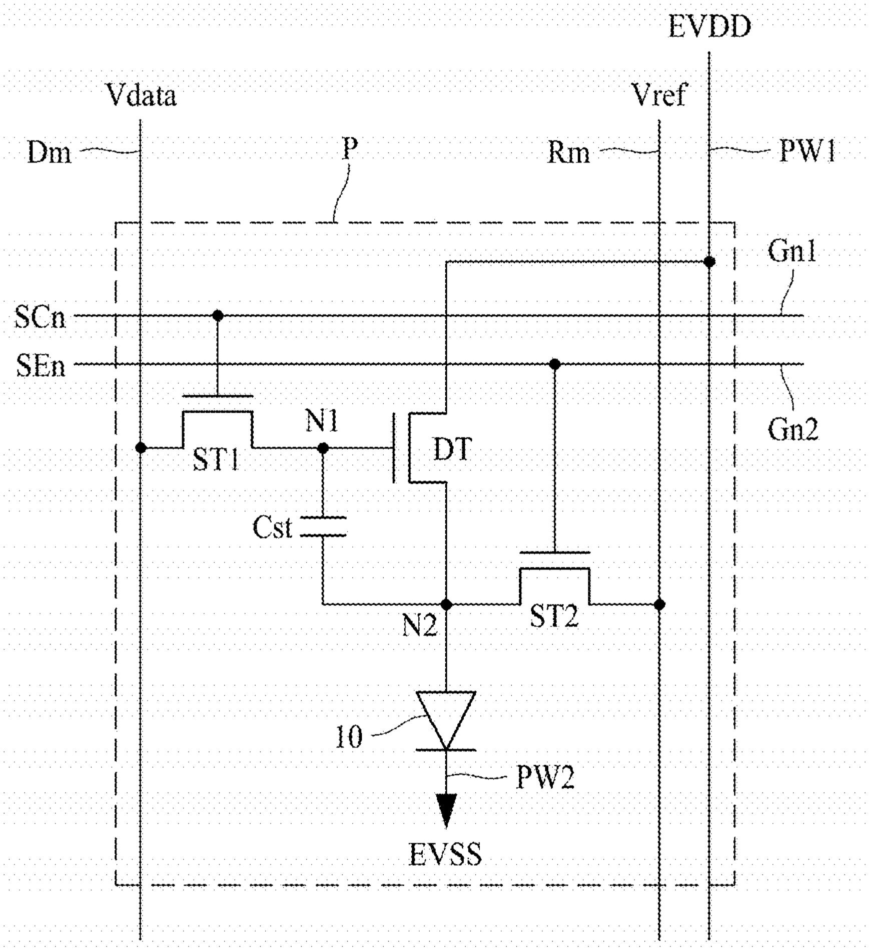
FIG. 2 is a circuit diagram illustrating a configuration of one pixel circuit according to an embodiment.

FIG. 1 is a block diagram illustrating a configuration of a display device according to an embodiment. FIG. 2 is a circuit diagram illustrating a configuration of one pixel circuit according to an embodiment.

As the display device according to the embodiment, which is designated by reference numeral “1000” in FIG. 1, an electroluminescent display using a self-luminous element may be employed. As the electroluminescent display, an organic light emitting diode (OLED) display, a quantum-dot light emitting diode display or an inorganic light emitting diode display may be employed. A micro-light emitting diode display may be applied to the display device 1000 according to the embodiment.

Referring to FIGS. 1 and 2, the display device 1000 may include a panel 100, a gate driver 200, a data driver 300, a timing controller 400 including an image processor 600, and a gamma voltage generator 500. The gate driver 200 and the data driver 300 may be collectively referred to as a panel driver. The gate driver 200, the data driver 300, the timing controller 400 and the gamma voltage generator 500 may be collectively referred to as a display driver.

The panel 100 displays an image through a display area DA corresponding to a pixel array area in which subpixels P are arranged in the form of a matrix. Basic pixels may each be constituted by three-color or four color subpixels among a red subpixel configured to emit red light, a green subpixel configured to emit green light, a blue subpixel configured to emit blue light, and a white subpixel configured to emit white light, or may each be constituted by two-color subpixels among the red, green, blue and white subpixels. Meanwhile, the panel 100 may be a panel including a touch sensor screen overlapping with a pixel array. The touch sensor screen may be built in or attached to the panel.

Subpixels P each include a light emitting element, and a pixel circuit configured to independently drive the light emitting element. As the light emitting element, an organic light emitting diode, a quantum-dot light emitting diode, an inorganic light emitting diode or a micro-light emitting diode may be employed. The pixel circuit includes a plurality of TFTs including a driving TFT configured to drive the light emitting element and a switching TFT configured to supply a data signal to the driving TFT, and a storage capacitor configured to store a driving voltage Vgs corresponding to the data signal supplied through the switching TFT and to supply the stored driving voltage Vgs to the driving TFT. In addition, the pixel circuit may further include a plurality of TFTs configured to initialize three electrodes (a gate, a source, and a drain), respectively, to connect the driving TFT to a diode structure, for compensation of a threshold voltage, or to control an emission time of the light emitting element. For a configuration of the pixel circuit, various configurations such as 3T1C (three TFTs and one capacitor), 7T1C (seven TFTs and one capacitor), etc., may be employed.

For example, as shown in FIG. 2, each subpixel P may include a light emitting element 10 connected between a first power line PW1 supplying a high-level driving voltage (a first driving voltage) EVDD and a second power line PWE supplying a low-level driving voltage (a second driving voltage) EVSS, and a pixel circuit including first and second switching TFTs ST1 and ST2, a driving TFT DT and a storage capacitor Cst, in order to independently drive the light emitting element 10.

The light emitting element 10 may include an anode connected to a source node N2 of the driving TFT DT, a cathode connected to the second power line PW2, and an organic light emitting layer between the anode and the cathode. The anode may be independent of those of other subpixels, whereas the cathode may be a common electrode shared by all subpixels. When driving current is supplied from the driving TFT DT to the light emitting element 10, electrons from the cathode are injected into the organic light emitting layer, and holes from the anode are injected into the organic light emitting layer, thereby causing a fluorescent or phosphorescent material to emit light, and, as such, the light emitting element 10 may emit light at a brightness proportional to a current value of the driving current.

The first switching TFT ST1 is driven by a scan gate pulse SCn supplied from the gate driver 200 to one gate line Gn1, and supplies, to a gate node N1 of the driving TFT DT, a data voltage Vdata supplied to a data line Dm.

The second switching TFT ST2 is driven by a sense gate pulse SEn supplied from the gate driver 200 to another gate line Gn2, and supplies, to a source node N2 of the driving TFT DT, a reference voltage Vref supplied from the data driver 300 to a reference line Rm. Meanwhile, in a sensing mode, the second switching TFT ST2 may provide, to the reference line Rm, current reflecting characteristics of the driving TFT DT or characteristics of the light emitting element 10.

The first and second switching TFTs ST1 and ST2 may be controlled by the different gate lines Gn1 and Gn2, as shown in FIG. 2, or may be controlled by the same gate line.

The storage capacitor Cst, which is connected between the gate node N1 and the source node N2 of the driving TFT DT, is charged with a differential voltage between the data voltage Vdata and the reference voltage Vref respectively supplied to the gate node N1 and the source node N2, as the driving voltage Vgs of the driving TFT DT, and holds the charged driving voltage Vgs for an emission period in which the first and second switching TFTs ST1 and ST2 are turned off.

The driving TFT DT controls current supplied from the first power line PW1 in accordance with the driving voltage Vgs supplied from the storage capacitor Cst and, as such, supplies driving current determined by the driving voltage Vgs to the light emitting element 10, thereby enabling the light emitting display element 10 to emit light.

The gate driver 200 is controlled in accordance with a plurality of gate control signals supplied from the timing controller 400 and, as such, may individually drive gate lines of the panel 100. The gate driver 200 supplies a scan signal of a gate-on voltage to a corresponding bone of the gate lines Gn1 and Gn2 during a driving period of the corresponding one of the gate lines Gn1 and Gn2, and supplies a gate-off voltage to the corresponding one of the gate lines Gn1 and Gn2 during a non-driving period of the corresponding one of the gate lines Gn1 and Gn2. The gate driver 200 may be formed together with the TFTs of the pixel array and, as such, may be built in the panel 100 in the form of a gate-in-panel (GIP).

The gamma voltage generator 500 generates a plurality of reference gamma voltages having different voltage levels, and supplies the plurality of reference gamma voltages to the data driver 300. The gamma voltage generator 500 may generate a plurality of reference gamma voltages corresponding to gamma characteristics of the display device under control of the timing controller 400, and may supply the plurality of reference gamma voltages to the data driver 300. The gamma voltage generator 500 may adjust levels of the reference gamma voltages in accordance with gamma data received from the timing controller 400, and may output the level-adjusted reference gamma voltages to the data driver 300. The gamma voltage generator 500 may adjust a high-level supply voltage, which is a maximum or highest gamma voltage, in accordance with peak luminance control by the timing controller 400, may adjust a plurality of reference gamma voltages in accordance with the high-level supply voltage, and may output the plurality of adjusted reference gamma voltages to the data driver 300.

The data driver 300 may be controlled in accordance with a data control signal received from the timing controller 400, may convert digital data received from the timing controller 400 into an analog data signal through a digital-to-analog converter, and may supply the analog data signal to each data line Dm of the panel 100. In this case, the data driver 300 may convert digital data into an analog data signal, using grayscale voltages sub-divided from the plurality of reference gamma voltages supplied from the gamma voltage generator 500.

The data driver 300 supplies a reference voltage Vref to a reference line Rm of the panel 100 under control of the timing controller 400. The data driver 300 may supply the reference voltage Vref under the condition that the reference voltage Vref is distinguished for a display purpose or a sensing purpose, under control of the timing controller 400.

The data driver 300 may sense a signal reflecting driving characteristics of each subpixel through each reference line Rm in a voltage sensing manner or in a current sensing manner, using a sensing unit or sensing circuit or sensor, under control of the timing controller 400.

For example, in a sensing mode, under control of the timing controller 400, the data driver 300 may convert data for sensing received from the timing controller 400 into a data voltage Vdata for sensing, may supply the data voltage for sensing to the data line Dm, and may supply a reference voltage Vref for sensing to the reference line Rm. In a subpixel selected by a scan gate pulse SCn and a sense gate pulse SEn from the gate driver 200, the driving TFT DT may be driven by a data voltage Vdata for sensing supplied through the first switching TFT ST1 and a reference voltage Vref for sensing supplied through the second switching TFT ST2 and, as such, may supply current to the light emitting element 10. Current reflecting electrical characteristics (threshold voltage, mobility, etc.) of the driving TFT DT or degradation characteristics (threshold voltage) of the light emitting element 10 may be charged, in the form of a voltage, in a line capacitor of the reference line Rm, which is in a floated state, through the second switching TFT ST2, or may be converted into a voltage through a current integrator connected to the reference line Rm. The data driver 300 may sample a voltage reflecting characteristics of each subpixel, may hold the sampled voltage, may convert the held voltage into sensing data through an analog-to-digital converter, and may output the sensing data to the timing controller 400.

The timing controller 400 may receive a source image and timing control signals from an external host system. The host system may be any one of portable terminals such as a computer, a TV system, a set-top box, a tablet computer, a portable phone, etc. The timing control signals may include a dot clock, a data enable signal, a vertical synchronization signal, a horizontal synchronization signal, etc.

The timing controller 400 may control the gate driver 200 and the data driver 300, using the timing control signals received from the host system and timing setting information stored therein. The timing controller 400 may generate a plurality of gate control signals for control of a driving timing of the gate driver 200, and may supply the plurality of gate control signals to the gate driver 400. The timing controller 400 may generate a plurality of data control signals for control of a driving timing of the data driver 300, and may supply the plurality of data control signals to the data driver 300.

The timing controller 400 may include the image processor 600 configured to perform various image processing operations for a source image. The image processor 600 may be disposed in a state of being separate from the timing controller 100, and may be connected to an input stage of the timing controller 400. In this case, an output of the image processor 600 may be supplied to the data driver 300 via the timing controller 400.

For an input image, the image processor 600 may discriminate data of a low-grayscale area where a problem associated with low-grayscale expression capability is generated. The image processor 600 may apply, to the discriminated low-grayscale area data, a reproduction mask pattern with a threshold value, a minimum or selected value and a detailed adjustment value being predetermined or selected as reproduction data and, as such, may convert the low grayscale area data into reproduction data of one of the threshold value, the minimum value and the detailed adjustment value in accordance with a pixel position in the reproduction mask pattern.

A threshold value for image data may be a minimum or selected one of grayscales or luminance values with uniformity performance secured through a uniformity measurement procedure. The threshold value may be varied in accordance with kinds of display devices. The threshold value may be a middle grayscale or a middle luminance exhibiting excellent uniformity and excellent grayscale expression capability. The threshold value may be a minimum one of grayscale values or luminance values of each color exhibiting excellent uniformity and excellent grayscale expression capability.

The minimum value may be a minimum grayscale (0-level grayscale) or a black-level grayscale or a black-level luminance, which is a minimum luminance. It should be understood that "minimum" may include a variety of meanings understandable to those skilled in the art. For example, the minimum grayscale may be a lowest or darkest grayscale value among a selected number of grayscale values. For example, grayscale values may include 0, 1, 2, . . . , 255, 256, and the "minimum grayscale" may be "0," which may correspond to a lowest data voltage Vdata (see FIG. 2) of a range of data voltages Vdata that may be applied to the gate electrode of the driving transistor DT. In some embodiments, the lowest data voltage Vdata is associated with the color black, as driving current provided by the driving transistor DT through the light emitting element 10 may be so low as to cause the light emitting element 10 to emit light only barely. The "minimum luminance," then, may be a very low luminance associated with the color black, corresponding to the light emitting element 10 just barely emitting light. In some embodiments, the lowest data voltage Vdata of the "minimum grayscale" may be associated with a gray color lighter than black. The "minimum grayscale" may be selected in a way that achieves an effect beneficial to performance (e.g., luminance uniformity) of the display panel 100. For example, the minimum grayscale may be 1, 2, 5 or another suitable value.

The detailed adjustment value may be determined so that an average luminance of the reproduction mask pattern constituted by the threshold value, the minimum value and the detained adjustment value is equal to a low-grayscale luminance. Although various grayscales (luminance values) may be used as the detailed adjustment value, the detailed adjustment value may be determined from among grayscales (luminance values) between the minimum value and the threshold value in accordance with an input low grayscale, taking into consideration the average luminance of the reproduction mask pattern. The detailed adjustment value may increase the number of expressible brightness values and, as such, the size of the reproduction mask pattern may be reduced, as compared to a reproduction mask pattern using only a threshold value and a minimum value.

The image processor 600 may vary application positions of the threshold value, the minimum value and the detailed adjustment value in the reproduction mask pattern, taking into consideration the lifespan of each light emitting element according to usage thereof. The image processor 600 may accumulate usage of each light emitting element by cumulatively counting data of each subpixel, and may vary application positions of the threshold value, the minimum value and the detailed adjustment value in the reproduction mask pattern in accordance with the order of accumulated usages of respective light emitting elements. As a result, the image processor 600 may reduce lifespan deviations among the light emitting elements.

The image processor 600 may output image data equal to or greater than the threshold value without processing the same.

The image processor 600 may further perform a plurality of image processing operations including picture quality correction, degradation correction, luminance correction for a reduction in power consumption, etc., before the above-described low-grayscale reproduction processing.

The timing controller 400 may further correct an output of the image processor 600 through application of a compensation value for a characteristic deviation of each subpixel stored in a memory, before supplying the output to the data driver 300. In the sensing mode, the timing controller 400 may sense characteristics of each subpixel P of the panel 100 through the data driver 300, and may update the compensation value of each subpixel P stored in the memory, using the sensing results. The sensing mode of the display device may be performed in accordance with instructions of the host system, may be performed upon user request through the host system, or may be performed in accordance with a driving sequence of the timing controller 400.

Thus, the display device 1000 including the image processor 600 according to the embodiment may reproduce data of the low-grayscale area where a problem associated with expression capability occurs, in accordance with an average combination of a threshold value securing uniformity performance, a minimum value and a detailed adjustment value through distributed arrangement, and, as such, an enhancement in uniformity and low-grayscale expression capability may be achieved, and the size of the reproduction mask pattern may be relatively reduced. As a result, it may be possible to prevent a pattern artifact in the form of the reproduction mask pattern from being recognized.

Figure 3:
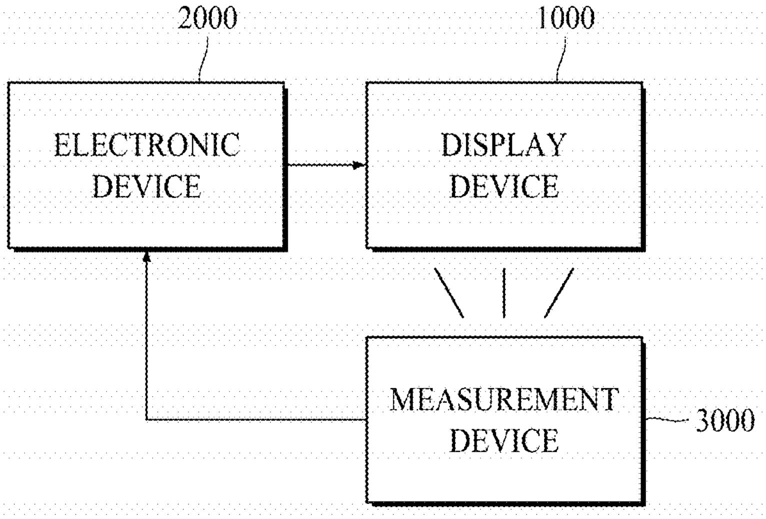
FIG. 3 is a diagram illustrating a test system for a display device according to an embodiment.
Figure 4:
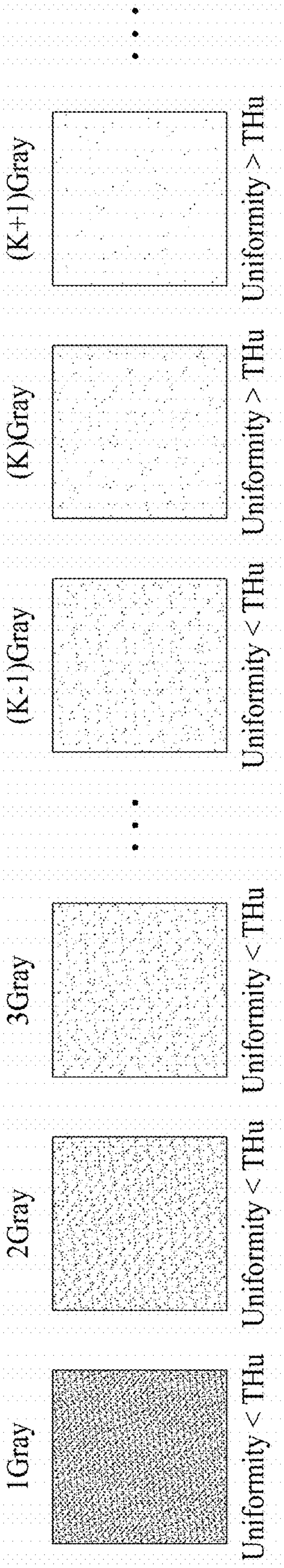
FIG. 4 is a view illustrating test images for uniformity measurement according to an embodiment.

FIG. 3 is a diagram illustrating a test system for a display device according to an embodiment. FIG. 4 is a view illustrating test images for uniformity measurement according to an embodiment.

Referring to FIG. 3, the display device test system includes a display device 1000, an electronic device 2000, and a measurement device 3000.

The display device 1000 may receive a test image for uniformity measurement from the electronic device 2000, and may display the test image on a panel 100 (cf. FIG. 1).

The display device 1000 may sequentially display test images of different grayscales and different colors supplied from the electronic device 2000. For example, the test images may be gray full pattern images increasing in grayscale from a 1-level grayscale one level by one level, as shown in FIG. 4.

The measurement device 3000 may photograph the test image displayed on the panel 100 of the display device 1000, may measure the luminance, chromaticity, etc., of the test image, and may then supply measurement results to the electronic device 2000. Whenever the test images of different grayscales shown in FIG. 4 are displayed one by one, the measurement device 3000 may measure the luminance of each of a plurality of sampling points having different positions in the panel 100, and may then supply measurement results to the electronic device 2000.

The electronic device 2000 may calculate, on a grayscale basis, uniformities corresponding to the ratio of a minimum or selected low luminance value to a maximum or selected high luminance value from among a plurality of sampling luminance values for the test images of different grayscales received from the measurement device 3000. The electronic device 2000 may compare the uniformities calculated on a grayscale basis with a predetermined or selected threshold uniformity Thu, and may then determine grayscales K, K+1, . . . of uniformities greater than the threshold uniformity Thu, as grayscales securing uniformity performance. The electronic device 2000 may determine a minimum grayscale K from among the grayscales K, K+1, . . . securing uniformity performance, as a grayscale threshold value applied to a reproduction mask pattern. The electronic device 2000 may supply the grayscale threshold value K securing uniformity performance to the display device 1000, thereby enabling the supplied grayscale threshold value K to be used as a threshold value of the reproduction mask pattern.

Figure 5:
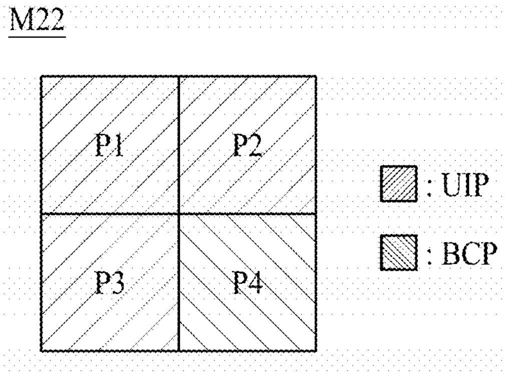
FIG. 5 is a diagram illustrating a reproduction mask pattern according to an embodiment.
Figure 6:
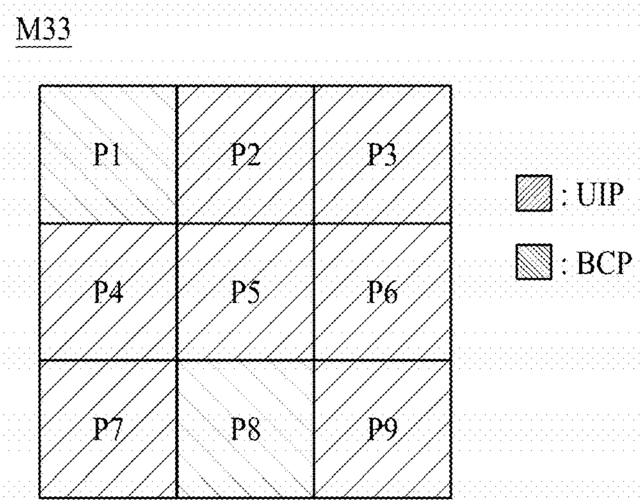
FIG. 6 is a diagram illustrating a reproduction mask pattern according to an embodiment.
Figure 7:
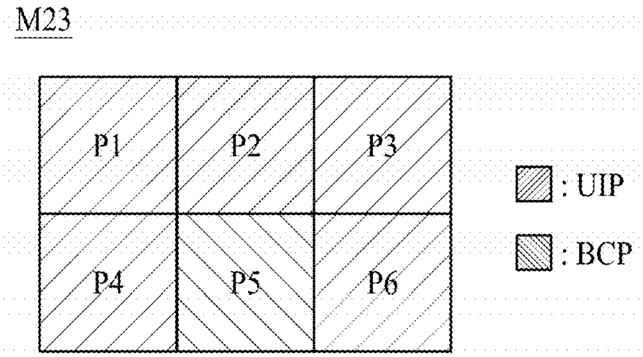
FIG. 7 is a diagram illustrating a reproduction mask pattern according to an embodiment.

FIGS. 5 to 7 are diagrams illustrating reproduction mask patterns according to embodiments, respectively.

Referring to FIG. 5, a reproduction mask pattern M22 having a size of a 2×2 pixel group may be used in order to convert data of a low-grayscale area into reproduction data that is excellent in terms of uniformity and expression capability. The reproduction mask pattern M22 may be set on a color basis. Reproduction mask patterns M22 of different colors may be applied to data of 2×2 pixel groups, for low-grayscale reproduction. Three mask values P1, P2 and P3 of a reproduction mask pattern M22 may be applied to three uniformity enhancement pixels UIP of a 2×2 pixel group, respectively, and one mask value P4 of the reproduction mask pattern M22 may be applied to one detailed brightness adjustment pixel BCP of the 2×2 pixel group. Positions of the mask values P1, P2 and P3 in the reproduction mask pattern M22 respectively applied to the uniformity enhancement pixels UIP and a position of the mask value P4 in the reproduction mask pattern M22 applied to the detailed brightness adjustment pixel BCP may be varied. A threshold value securing uniformity performance and a minimum value may be allocated to each of the mask values P1, P2 and P3 applied to the uniformity enhancement pixels UIP of the reproduction mask pattern M22 in accordance with an input grayscale, and the numbers and positions of threshold values and minimum values allocated in accordance with input grayscales may be varied. A detailed adjustment value between a minimum value and a threshold value may be variably allocated to the mask value P4 applied to the detailed brightness adjustment pixel BCP of the reproduction mask pattern M22 in accordance with an input grayscale. The mask values P1 to P4 of the reproduction mask pattern M22 may be referred to collectively as low-grayscale reproduction data.

Referring to FIG. 6, a reproduction mask pattern M33 having a size of a 3×3 pixel group may be used in order to convert data of a low-grayscale area into reproduction data that is excellent in terms of uniformity and expression capability. The reproduction mask pattern M33 may be set on a color basis. Reproduction mask patterns M33 of different colors may be applied to data of 3×3 pixel groups, for low-grayscale reproduction. Seven mask values P2, P3 to P7 and P9 of a reproduction mask pattern M33 may be applied to seven uniformity enhancement pixels UIP of a 3×3 pixel group, respectively, and two mask values P1 and P8 of the reproduction mask pattern M33 may be applied to two detailed brightness adjustment pixels BCP of the 3×3 pixel group, respectively. Positions of the mask values P2, P3 to P7 and P9 in the reproduction mask pattern M33 respectively applied to the uniformity enhancement pixels UIP and positions of the mask values P1 and P8 in the reproduction mask pattern M33 respectively applied to the detailed brightness adjustment pixels BCP may be varied. A threshold value securing uniformity performance and a minimum value may be allocated to each of the mask values P2, P3 to P7 and P9 applied to the uniformity enhancement pixels UIP of the reproduction mask pattern M33 in accordance with an input grayscale, and the numbers and positions of threshold values and minimum values allocated in accordance with input grayscales may be varied. A detailed adjustment value between a minimum value and a threshold value may be variably allocated to each of the mask values P1 and P8 applied to the detailed brightness adjustment pixels BCP of the reproduction mask pattern M33 in accordance with an input grayscale. The mask values P1 to P9 of the reproduction mask pattern M33 may be referred to collectively as low-grayscale reproduction data.

Referring to FIG. 7, a reproduction mask pattern M23 having a size of a 2×3 pixel group may be used in order to convert data of a low-grayscale area into reproduction data that is excellent in terms of uniformity and expression capability. The reproduction mask pattern M23 may be set on a color basis. Reproduction mask patterns M23 of different colors may be applied to data of 2×3 pixel groups, for low-grayscale reproduction. Five mask values P1 to P4 and P6 of a reproduction mask pattern M23 may be applied to five uniformity enhancement pixels UIP of a 2×3 pixel group, respectively, as shown by the cross-hatching pattern of FIG. 7, and one mask value P5 of the reproduction mask pattern M23 may be applied to one detailed brightness adjustment pixel BCP of the 2×3 pixel group. Positions of the mask values P1 to P4 and P6 in the reproduction mask pattern M23 respectively applied to the uniformity enhancement pixels UIP and a position of the mask value P5 in the reproduction mask pattern M23 applied to the detailed brightness adjustment pixel BCP may be varied. A threshold value securing uniformity performance and a minimum value may be allocated to each of the mask values P1 to P4 and P6 applied to the uniformity enhancement pixels UIP of the reproduction mask pattern M23 in accordance with an input grayscale, and the numbers and positions of threshold values and minimum values allocated in accordance with input grayscales may be varied. A detailed adjustment value between a minimum value and a threshold value may be variably allocated to the mask value P5 applied to the detailed brightness adjustment pixel BCP of the reproduction mask pattern M23 in accordance with an input grayscale. The mask values P1 to P6 of the reproduction mask pattern M23 may be referred to collectively as low-grayscale reproduction data.

The reproduction mask pattern applied to data of a low-grayscale area in order to convert the data of the low-grayscale area into data that is excellent in terms of uniformity and expression capability is not limited to the reproduction mask patterns M22, M33 and M23 shown in FIGS. 5 to 7 and, as such, may have various pixel sizes in accordance with pixels per inch (PPI) of the display device and the desire of the user.

The lower the PPI of the display device, the smaller the size of the reproduction mask pattern.

The size of the reproduction mask pattern may be determined, taking into consideration the PPI of the display device and the viewing distance of the user. That is, the size of the reproduction mask pattern may be determined within a range in which a pattern artifact formed due to application of the reproduction mask pattern is not recognized, taking into consideration a PPI limit corresponding to a resolution of the user's eye according to the viewing distance of the user. The size of the reproduction mask pattern may be varied in accordance with the desire of the user (a request signal).

For example, assuming that, when the viewing distance is 60 cm, the PPI limit of display devices is 150 PPI, and the pixel density of a target display device is 300 PPI, the reproduction mask pattern may be determined to have a 2×2 pixel size shown in FIG. 5, without being limited thereto.

The numbers of detailed brightness adjustment pixels BCP allocated with detailed adjustment values in the reproduction mask patterns M22, M33 and M23 may be determined in accordance with the sizes of the reproduction mask patterns and the desire of the user.

Figure 8:
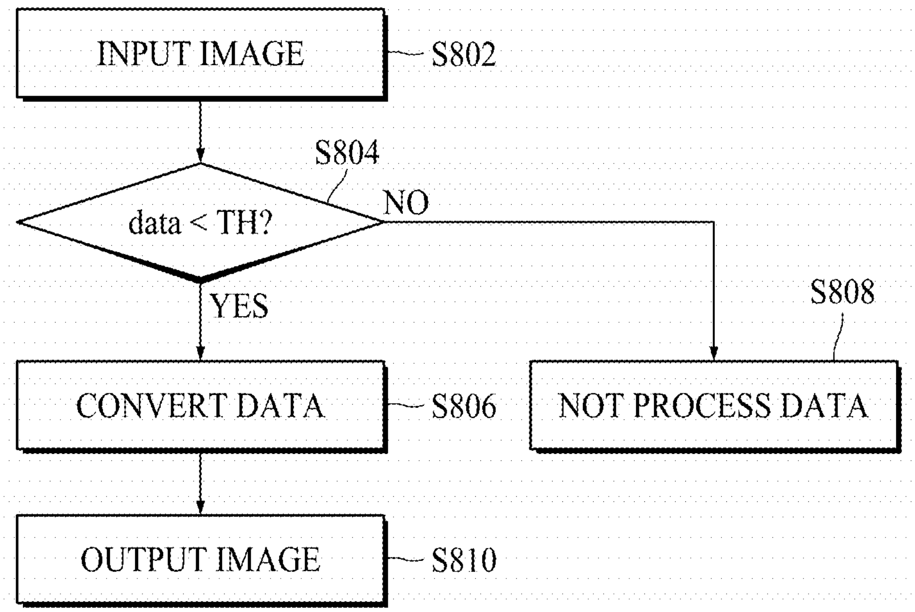
FIG. 8 is a flowchart illustrating an image processing method of a display device according to an embodiment.
Figure 9:
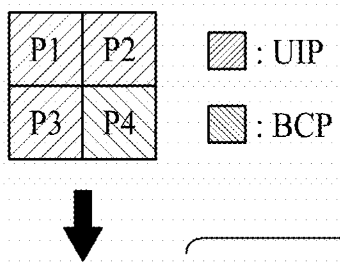
FIG. 9 is a diagram illustrating a low-grayscale reproduction method using a reproduction mask pattern according to an embodiment.

FIG. 8 is a flowchart illustrating an image processing method of a display device according to an embodiment. FIG. 9 is a diagram illustrating a low-grayscale reproduction method using a reproduction mask pattern according to an embodiment.

The image processing method shown in FIG. 8 is performed by the image processor 600 described with reference to FIG. 1.

Referring to FIG. 8, the image processor 600 receives an input image (S802), and discriminates whether data of the input image is data of a low-grayscale area lower than a threshold value TH securing uniformity performance, through comparison of the data of the input image with the threshold value TH (S802 and S804). The image processor 600 may compare each color-based datum of the input image with a color-based threshold value TH corresponding thereto, and, as such, may discriminate whether each color datum is low-grayscale data lower than the corresponding color threshold value TH.

The image processor 600 outputs the input data without processing (converting) the same when the input data is equal to or greater than the threshold value TH (NO) (S808).

When the input data is determined to be low-grayscale data lower than the threshold value TH (YES), the image processor 600 converts the input data into low-grayscale reproduction data through application of a reproduction mask pattern to the input data (S806), and then outputs the converted data (S810).

When each color datum is lower than the threshold value TH of the color corresponding thereto, the color data may be converted into low-grayscale reproduction data through application of a reproduction mask pattern of the corresponding color, and may then output the low-grayscale reproduction data.

For example, as shown in FIG. 9, the image processor 600 may convert data of a low-grayscale area lower than a threshold value TH securing uniformity performance into low-grayscale reproduction data by applying the reproduction mask pattern M22 having the 2×2 pixel size described with reference to FIG. 5 to the data of the low grayscale area on a color basis, and may then output the low-grayscale reproduction data.

Referring to FIG. 9, each low-grayscale datum of three uniformity enhancement pixels UIP in a 2×2 pixel group of a low-grayscale image, to which the reproduction mask pattern M22 is applied, may be converted into a corresponding one of mask values P1, P2 and P3 with respective threshold values TH and respective minimum values 0 distributively arranged, in accordance with a corresponding one of grayscales. Low-grayscale data of one detailed brightness adjustment pixel BCP in the 2×2 pixel group may be converted into a corresponding one of detailed adjustment values C, D, E, . . . , which is a mask value P4. The detailed adjustment values C, D, E, . . . of the detailed brightness adjustment pixel BCP may be determined between a minimum value 0 and a threshold value TH in accordance with grayscales 1, . . . , A, B, . . . , respectively.

In addition, the image processor 600 may accumulate usage of each light emitting element by cumulatively counting data of each subpixel, and may vary application positions of the threshold value TH, the minimum value 0 and the detailed adjustment values C, D, E, . . . within a range of the reproduction mask pattern M22 in accordance with the order of accumulated usages of respective light emitting elements. As a result, the image processor 600 may reduce lifespan deviations among the light emitting elements.

Thus, the display device according to the embodiment may reproduce data of a low-grayscale or low-luminance (low-grayscale/low-luminance) area inferior in terms of expression capability and uniformity into an average combination of a threshold value securing uniformity performance, a minimum value and a detailed adjustment value through distributed arrangement, using a reproduction mask.

Accordingly, the display device according to the embodiment may secure low-grayscale uniformity performance by a uniformity enhancement pixel, to which a threshold value securing uniformity performance and a minimum value are applied, and, as such, may achieve an enhancement in low-grayscale expression capability. In addition, the display device according to the embodiment may achieve an enhancement in low-grayscale expression capability while relatively reducing the size of the reproduction mask pattern by a detailed brightness adjustment pixel, to which a detailed adjustment value is applied, and, as such, it may be possible to prevent the reproduction mask pattern from being recognized in the form of a pattern artifact.

Figure 10:
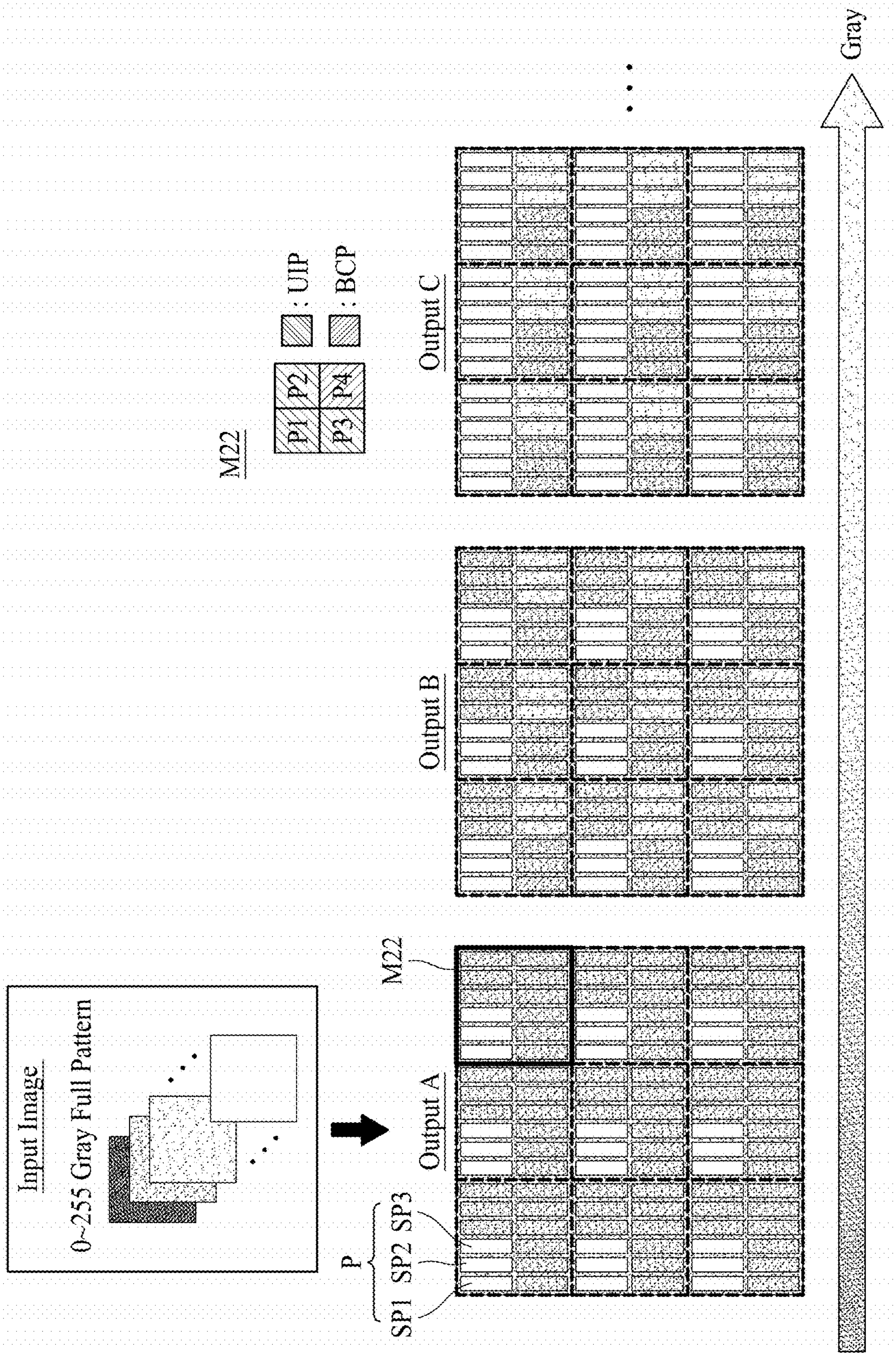
FIG. 10 is an enlarged view of a portion of an output image with respect to an input image of a low-grayscale area in a display device according to an embodiment.
Figure 11:
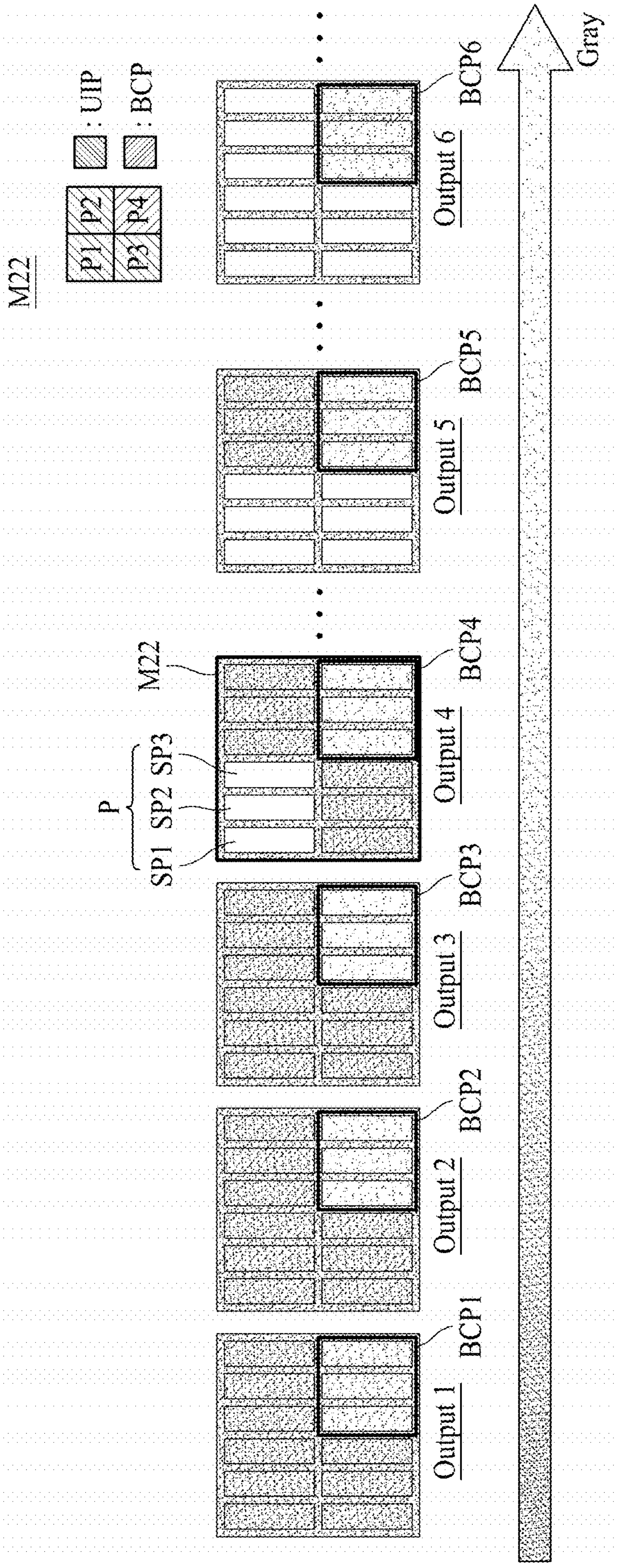
FIG. 11 is enlarged views of portions of low-grayscale output images of a display device according to an embodiment.

FIG. 10 is an enlarged view of a portion of an output image with respect to an input image of a low-grayscale area in a display device according to an embodiment. FIG. 11 is enlarged views of portions of low-grayscale output images of a display device according to an embodiment.

Output images with respect to input images shown in FIGS. 10 and 11 may be checked using the test system of the display device described with reference to FIG. 3.

Referring to FIGS. 3 and 10, the display device 1000 according to the embodiment may receive gray full pattern test images increasing in grayscale from a 0-level grayscale one level by one level, and may display the gray full pattern test images on the panel 100 (cf. FIG. 1).

Whenever the display device 1000 displays a low-grayscale test image on a grayscale basis, the measurement device 3000 may photograph the pixels of the display device 1000, may measure a luminance and a color of each pixel, and may supply measurement results to the electronic device 2000. For example, each pixel P of the display device 1000 may include a plurality of subpixels SP1, SP2 and SP3 of different colors. In this case, the measurement device 3000 may photograph a luminance and a color of each of the subpixels SP1, SP2 and SP3 and, as such, may measure the luminance and the color.

The electronic device 2000 may check whether or not patterns having the same size are periodically and repeatedly displayed, from grayscale-based output images Output A, Output B, Output C, . . . of the display device 1000 received through the measurement device 3000, thereby checking whether or not a reproduction mask pattern is used.

For example, the electronic device 2000 may check whether or not a reproduction mask pattern 22, in which patterns having the same size are periodically repeated, is used, from the grayscale-based output images Output A, Output B, Output C, . . . shown in FIG. 10.

The display device 1000 may enable uniformity enhancement pixels UIP in a 2×2 pixel group corresponding to the reproduction mask pattern M22 to display mask values P1, P2 and P3 while enabling a detailed brightness adjustment pixel BCP in the 2×2 pixel group to display a mask value P4 having detailed adjustment values according to grayscales.

The electronic device 2000 may receive measurement results of the grayscale-based output images Output A, Output B, Output C, . . . through the measurement device 3000. From the measurement results of the grayscale-based output images Output A, Output B, Output C, . . . , the electronic device 2000 may check whether or not the uniformity enhancement pixels UIP of the 2×2 pixel group corresponding to the reproduction mask pattern M22 operate as a first pixel (white portion) displaying a first luminance by a threshold value and a second pixel (a dot portion of high density) displaying a second luminance (a black-level luminance) lower than the first luminance by a minimum value, and whether or not the detailed brightness adjustment pixel BCP operates as a third pixel (a dot portion of low density) displaying, by a detailed adjustment value, a third luminance finely varying in brightness between the first luminance and the second luminance in accordance with grayscales.

In detail, referring to FIG. 11, the electronic device 2000 may detect each of pixel groups in which patterns having the same size are repeated, from measurement results of the output images Output 1 to Output 6 of the display device 1000 with respect to an input image increasing in low grayscale on a level basis, thereby checking whether or not the reproduction mask pattern M22 is applied.

From a measurement luminance of a 2×2 pixel group, the electronic device 2000 may check whether or not uniformity enhancement pixels UIP constituted by a first pixel (an on-pixel) displaying a first luminance by a threshold value and a second pixel (an off-pixel) displaying a second luminance (a black-level luminance) by a minimum value while varying in numbers and positions of the first pixel (the on-pixel) and the second pixel (the off-pixel) in accordance with grayscales are present. In addition, from the measurement luminance of the 2×2 pixel group, the electronic device 2000 may check whether or not detailed brightness adjustment pixels (third pixels) BCP1 to BCP6 displaying a third luminance finely varying in brightness between the first luminance and the second luminance in accordance with grayscales.

Thus, the electronic device 2000 may check whether or not a reproduction mask pattern including a uniformity enhancement pixel UIP and a detailed brightness adjustment pixel BCP while having repeated patterns of the same size is applied, by measuring a luminance and a color of each pixel displaying an output image with respect to an input test image (a gray full pattern).

Furthermore, the electronic device 2000 may measure output images displaying the same low-grayscale input image in the display device 1000 before and after the display device 1000 is driven for a long time, and may compare the measured output images with one another and, as such, may further check whether or not positions of a first pixel displaying a threshold value, a second pixel displaying a minimum value, and a third pixel displaying a detailed adjustment value in pixels, to which a reproduction mask pattern is applied, are varied in accordance with passage of a driving time of the display device 1000, that is, accumulated usage of each light emitting element.

Figure 12:
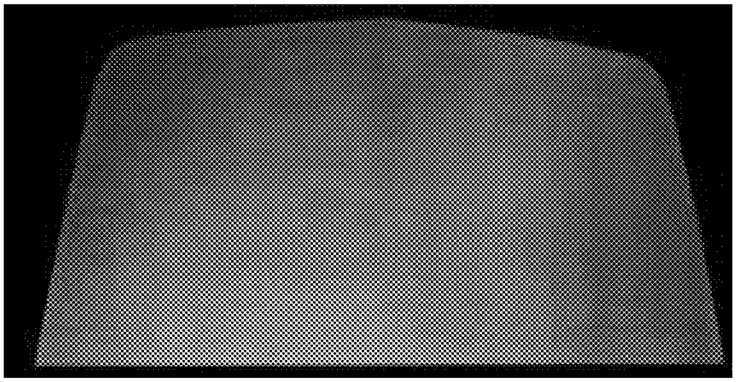
FIG. 12 is a view showing comparison of a low-grayscale output image of a display device according to an embodiment with a comparative example.
Figure 12:
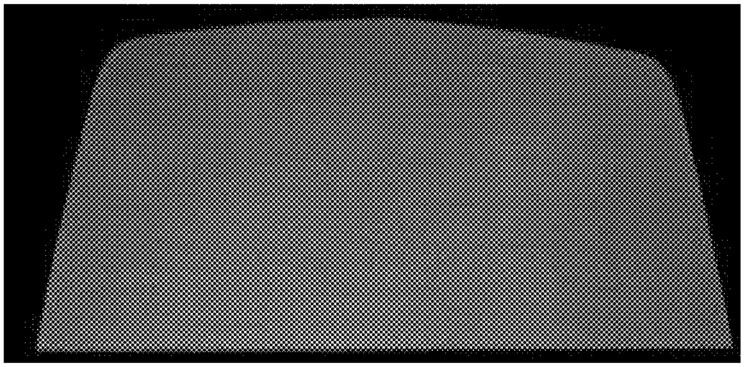

FIG. 12 is a view showing comparison of a low-grayscale output image of a display device according to an embodiment with a comparative example.

Referring to FIG. 12, from photographing results of 16-gray full pattern images displayed in a display device of the comparative example and the display device according to the embodiment, it can be seen that, in the display device of the comparative example, a picture quality degradation problem such as a burn-in phenomenon occurs because the luminance uniformity of a low-grayscale output image is relatively low, whereas, in the display device of the embodiment, the uniformity of a low-grayscale output image is enhanced and, as such, an enhancement in picture quality is achieved without occurrence of a burn-in phenomenon, and a pattern artifact in the form of a reproduction mask pattern is not recognized.

As apparent from the above description, the display device according to the embodiment may reproduce data of the low-grayscale/low-luminance area where a problem associated with expression capability occurs, in accordance with an average combination of a threshold value securing uniformity performance, a minimum value and detailed adjustment values through distributed arrangement, thereby securing low-grayscale/low-luminance uniformity performance, and, as such, an enhancement in low-grayscale/low-luminance expression capability may be achieved, and the size of the reproduction mask pattern may be relatively reduced. As a result, it may be possible to prevent a pattern artifact in the form of the reproduction mask pattern from being recognized in a display device having a low PPI.

The display device according to one or more embodiments of the present disclosure may be applied to various electronic devices. For example, the display device according to one embodiment of the present disclosure may be applied to a mobile device, a video phone, a smart watch, a watch phone, a wearable device, a foldable device, a rollable device, a bendable device, a flexible device, a curved device, an electronic diary, electronic book, a portable multimedia player (PMP), a personal digital assistant (PDA), MP3 player, a mobile medical device, a desktop PC, a laptop PC, a netbook computer, a workstation, a navigator, a vehicle navigator, a vehicle display device, a television, a wall paper display device, a signage device, a game device, a notebook computer, a monitor, a camera, a camcorder, and home appliances.

Characteristics, structures, effects, and so on described in above embodiments are included in at least one of the embodiments, but are not limited to only one embodiment invariably. Furthermore, it is apparent that the features, the structures, the effects, and so on described in the embodiments can be combined or modified with other embodiments by those skilled in the art to which the present disclosure pertains. Therefore, it should be understood that the contents relevant to such combination and modification fall within the technical scope or right scope of the disclosure.

Those skilled in the art to which the present disclosure pertains can appreciate that the disclosure as described above is not limited to the above-described embodiments and the accompanying drawings, and various substitutions, modifications and changes may be made without departing from the technical idea of the disclosure. Therefore, the scope of the disclosure should be interpreted by the claims below. The meaning and scope of the claims and all modifications as would be derived from the equivalent concept intended to be included within the scope of the disclosure should also be interpreted as falling within the scope of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

an image processor configured to:

convert first data of an input image into reproduction data by a reproduction mask pattern, the reproduction mask pattern including a selected value, a threshold value and an adjustment value between the selected value and the threshold value wherein the first data is lower than the threshold value; and output the reproduction data;

a panel comprising a plurality of pixels; and a panel driver configured to supply an output of the image processor to the panel, wherein pixels displaying the reproduction data include:

a first pixel displaying a first luminance corresponding to the threshold value;

a second pixel displaying a second luminance lower than the first luminance, the second luminance corresponding to the selected value; and a third pixel displaying a third luminance between the first luminance and the second luminance, the third luminance corresponding to the adjustment value;

wherein the image processor is configured to output second data of the input image that is equal to or greater than the threshold value without converting the second data by the reproduction mask.

2. The display device according to claim 1, wherein the threshold value is a minimum grayscale value or a minimum luminance value of pieces of data for securing uniformity performance in a uniformity measurement of a grayscale-based output image displayed on the panel.

3. The display device according to claim 1, wherein the threshold value comprises threshold values of respective colors of subpixels of the pixels, the threshold values being determined on a color basis.

4. The display device according to claim 1, wherein the adjustment value is between the selected value and the threshold value, and is determined in accordance with the first data.

5. The display device according to claim 1, wherein, in a group of N×M pixels to which the reproduction mask pattern with an N×M pixel size is applied, numbers and positions of the first pixel and the second pixel are varied in accordance with the first data, N and M being natural numbers of 2 or greater.

6. The display device according to claim 5, wherein positions of the first pixel, the second pixel and the third pixel are varied within the group of N×M pixels in accordance with accumulated usage of respective light emitting elements of the subpixels.

7. The display device according to claim 5, wherein the group of N×M pixels comprises the third pixel, a number of the third pixel being one or two.

8. The display device of claim 1, wherein the selected value is associated with a black-level luminance.

9. A display device comprising:

an image processor configured to:

convert first data of an input image into reproduction data by a reproduction mask pattern, the reproduction mask pattern having a selected value, a threshold value and an adjustment value between the selected value and the threshold value; and output the reproduction data;

a panel comprising a plurality of pixels; and a panel driver configured to supply an output of the image processor to the panel, wherein pixels displaying the reproduction data include:

a first pixel displaying a first luminance corresponding to the threshold value;

a second pixel displaying a second luminance lower than the first luminance, the second luminance corresponding to the selected value; and at least one third pixel displaying a third luminance between the first luminance and the second luminance, the third luminance corresponding to the adjustment value, wherein a size of the reproduction mask pattern and a number of the at least one third pixels are determined by least one of: taking into consideration pixels per inch (PPI) of the panel, a viewing distance of a user, and an adjustment request signal from the user.

10. A driving method of a display device comprising:

converting first data, lower than a threshold value, of an input image into reproduction data by a reproduction mask pattern;

outputting the reproduction data including a selected value, the threshold value and an adjustment value between the selected value and the threshold value as the reproduction data; and displaying the output data on a panel, wherein pixels of the panel displaying the reproduction data include:

a first pixel displaying a first luminance corresponding to the threshold value;

a second pixel displaying a second luminance lower than the first luminance, the second luminance corresponding to the selected value; and a third pixel displaying a third luminance between the first luminance and the second luminance, the third luminance corresponding to the adjustment value, wherein the threshold value is a selected luminance value of pieces of the output data for securing uniformity performance in a uniformity measurement of a grayscale-based output image displayed on the panel.

11. The driving method according to claim 10, wherein second data that is equal to or greater than the threshold value, of the input image is output without the converting being carried out.

12. The driving method according to claim 10, wherein the threshold value is a grayscale value for securing uniformity performance in a uniformity measurement of a grayscale-based output image displayed on the panel.

13. The driving method according to claim 10, wherein the threshold value comprises threshold values of respective colors of subpixels of the pixels, the threshold values being determined on a color basis.

14. The driving method according to claim 10, wherein, in a group of N×M pixels to which the reproduction mask pattern with an N×M pixel size is applied, numbers and positions of the first pixel and the second pixel are varied in accordance with the first data, N and M being natural numbers equal to or greater than 2.

15. The driving method according to claim 14, wherein positions of the first pixel, the second pixel and the third pixel are varied within the group of N×M pixels in accordance with accumulated usage of respective light emitting elements of each of the sub pixels.

16. A display device, comprising:

a display panel including:

a first pixel;

a second pixel adjacent the first pixel;

a third pixel adjacent the first pixel; and a fourth pixel adjacent the second pixel and the third pixel;

an image processor which, in operation:

converts first data of an input image into reproduction data by a reproduction mask pattern, the first data being lower than a threshold value, the reproduction data including a selected value, the threshold value, and an adjustment value, the adjustment value being between the selected value and the threshold value; and outputs the reproduction data; and a driving circuit coupled to the display panel, wherein the driving circuit, in operation:

drives the first pixel, the second pixel, the third pixel and the fourth pixel according to the reproduction data, wherein the adjustment value is selected based on an average luminance of the first data associated with the first, second, third and fourth pixels.

17. A display device comprising:

a display panel including:

a first pixel;

a second pixel adjacent the first pixel;

a third pixel adjacent the first pixel;

a fourth pixel adjacent the second pixel and the third pixel;

a fifth pixel adjacent the second pixel; and a sixth pixel adjacent the fifth pixel and the fourth pixel;

an image processor which, in operation:

converts first data of an input image into reproduction data by a reproduction mask pattern, the reproduction data including a selected value, a threshold value, and an adjustment value, the adjustment value being between the selected value and the threshold value; and outputs the reproduction data; and a driving circuit coupled to the display panel, wherein the driving circuit, in operation: drives the first pixel, the second pixel, the third pixel and the fourth pixel according to the reproduction data, wherein the driving circuit, in operation, drives the fifth and sixth pixels according to the reproduction data; and the reproduction data includes five uniformity enhancement pixels, each having the selected value or the threshold value, and further includes one detailed brightness adjustment pixel having the adjustment value.

18. The display device of claim 17, wherein the display panel further comprises:

a seventh pixel adjacent the second pixel;

an eighth pixel adjacent the seventh pixel and the fourth pixel; and a ninth pixel adjacent the eighth pixel and the sixth pixel;

the driving circuit, in operation, drives the seventh, eighth and ninth pixels according to the reproduction data; and the reproduction data includes seven uniformity enhancement pixels, each having the selected value or the threshold value, and further includes two detailed brightness adjustment pixels having the adjustment value.

* * * * *